Nov. 9, 1971     R. A. FOTLAND     3,618,504
OPTICAL DEVELOPMENT PROCESS AND APPARATUS
Filed Oct. 9, 1968     3 Sheets-Sheet 1
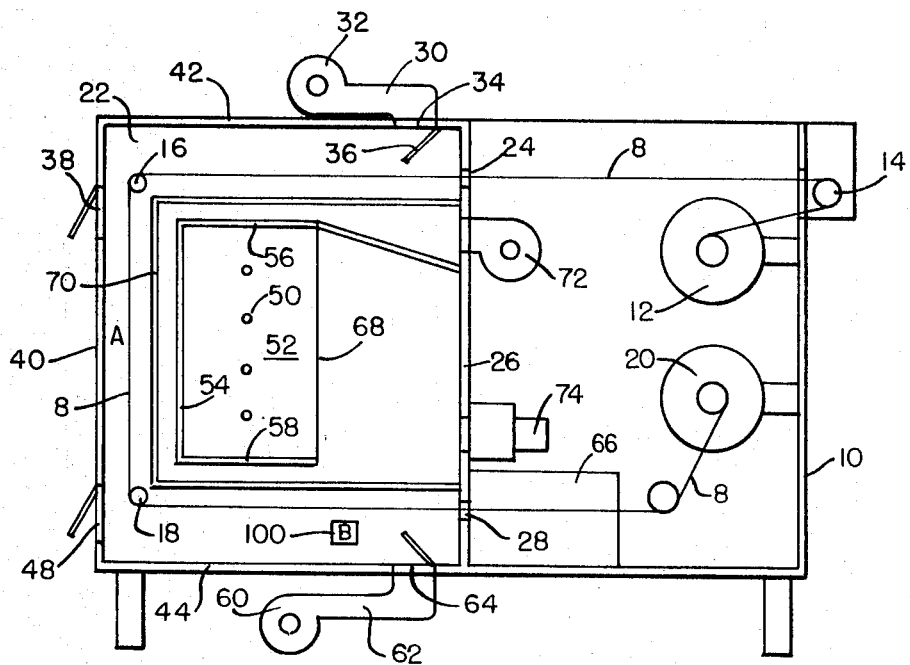
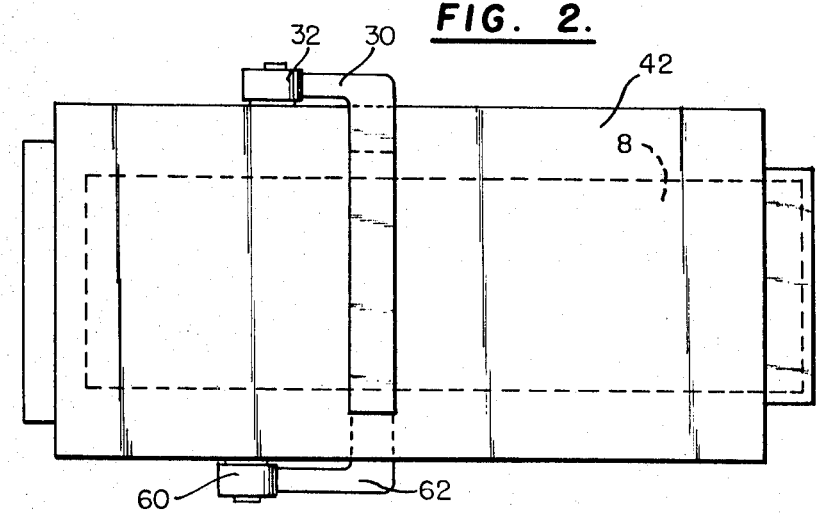
INVENTOR
Richard A. Fotland
BY Lawrence I. Field
ATTORNEY

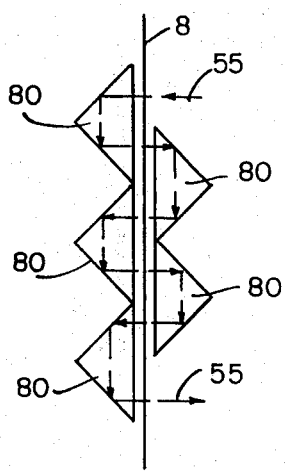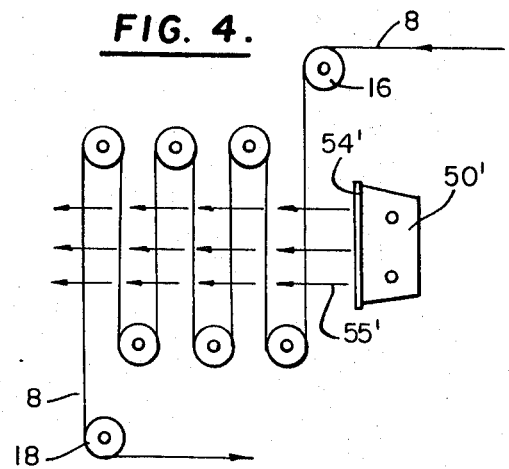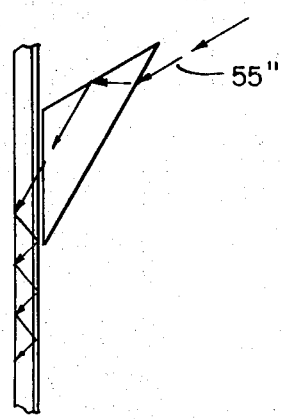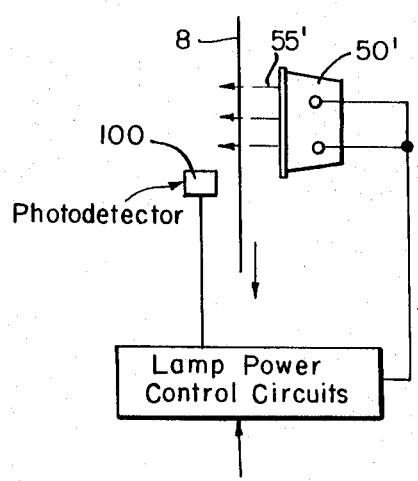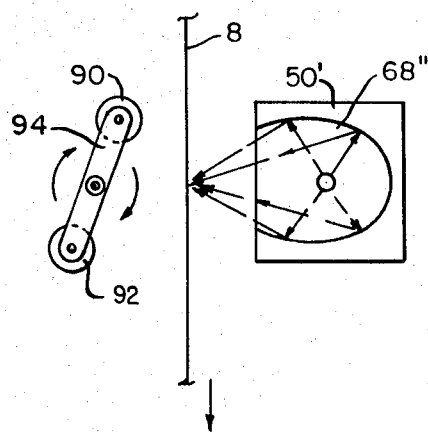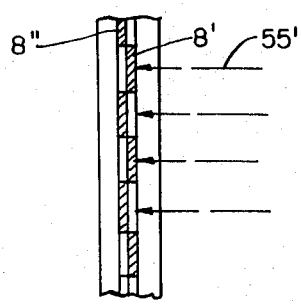

Nov. 9, 1971    R. A. FOTLAND    3,618,504
OPTICAL DEVELOPMENT PROCESS AND APPARATUS
Filed Oct. 9, 1968    3 Sheets-Sheet 3

INVENTOR
Richard A. Fotland

BY *Lawrence O. Field*

ATTORNEY

United States Patent Office 3,618,504
Patented Nov. 9, 1971

3,618,504
OPTICAL DEVELOPMENT PROCESS AND APPARATUS
Richard A. Fotland, Lyndhurst, Ohio, assignor to Horizons Incorporated, a division of Horizons Research Incorporated
Filed Oct. 9, 1968, Ser. No. 766,160
Int. Cl. G03d *13/00*
U.S. Cl. 95—89    9 Claims

ABSTRACT OF THE DISCLOSURE

An apparatus for rendering visible, the faintly visible or entirely invisible latent image produced by photographic exposure of a free radical film to a small dose of radiation; the apparatus being adapted to process the film by dry means only.

---

Figure 7:
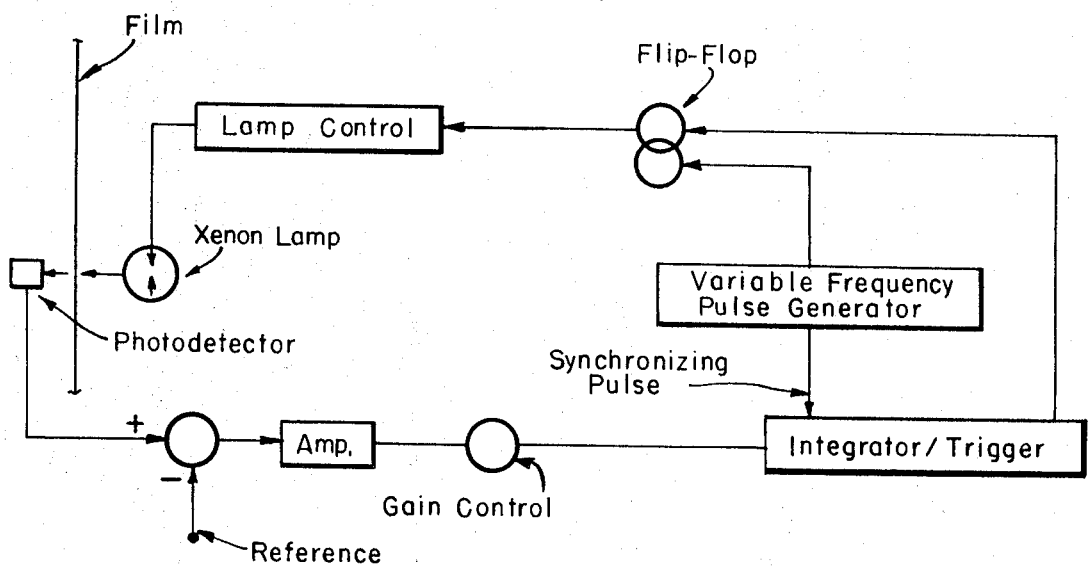

This invention relates to an apparatus and its use for producing photosensitive materials for the purpose of producing a visible image in a film material which contains a latent image.

In papers published in Photographic Science and Engineering, vol. 5, No. 2, pp. 98–103 (1961) and vol. 8, No. 2, pp. 91–103 (1964), and in a number of issued U.S. patents including No. 3,042,515 and others and in pending applications, assigned to Horizons Incorporated, the disclosures of which are incorporated herein by reference, photographic films designated as free radical films have been described. Many of the photosensitive compositions described and known in this body of prior art comprise (1) an organic halogen compound in which at least three halogen (Br, Cl, or I) atoms are attached to a single carbon atom and (2) a nitrogen compound, such as a leuco di- or tri-arylmethane compound. These compositions produce a visible image directly upon exposure to large doses of radiation. Many of the photosensitive compositions set forth in said issued patents and pending applications also produce an optically developable invisible (latent) or faintly visible image upon photographic exposure to a small dose of energy. Such invisible or faintly visible images must be converted to visible images before the information contained in the image can be used.

As described particularly in U.S. patent application Ser. No. 552,414, filed May 24, 1966, the disclosure of which is incorporated herein by reference, and in a paper presented at the 1968 Spring meeting of the Society of Photographic Scientists and Engineers, and as described in U.S. patent application, Ser. No. 725,885, filed May 1, 1968, the disclosures of which are incorporated herein by reference, it is known that the faint image which first appears in such films during photographic exposure can be rapidly intensified by applying a blanket dose of radiation of selected wavelength to the exposed film. When such radiation is applied to the entire film surface, there results an intensification of the image which is thereby rendered visible before any substantial amount of fogging occurs in the unexposed areas of the film. By choice of the quantity and quality of the applied radiation, i.e. by selection of wavelength and duration of exposure and the temperature of the film being developed, the gamma and contrast of the resulting image can be controlled.

The present invention relates to an apparatus for the rapid processing of such film. This apparatus is described and shown in the accompanying specification and drawings in which FIG. 1 is a schematic cross section of a portion of the apparatus;

FIG. 2 is a top plan view of the apparatus of FIG. 1; and

FIGS. 3–10 schematically show various additional elements and modifications of the apparatus of FIG. 1.

As shown in FIG. 1, the optical developing apparatus including a housing 10 in which there are suitably supported means to transport a film 8 from a payout reel 12 over a drive capstan 14 and guide rollers 16 and 18 to a takeup reel 20 or to conventional apparatus (not shown) for severing the film into pieces of any suitable length, e.g. into individual frames or groups of frames.

As the film 8 proceeds from the payout reel 12 to the takeup reel 20, it enters into a compartment 22 where optical development is effected. Film 8 passes through a slit 24 in sidewall 26 of compartment 22. Another slit 28 also located in sidewall 26 permits exit of the film from compartment 22. Once it has entered compartment 22, the film is exposed to thermal energy preferably in the form of a moving stream of heated air or hot inert gas blown into compartment by heater 30 and blower 32. The hot gas enters the compartment adjacent to slit 24, through port 34. A baffle 36 is provided adjacent to port 34 in order to direct the hot gas and to cause it to flow parallel to the direction of film movement. Film 8 passes over guide roller 16 while the hot gas exits from compartment 22 through an upper exit port 38 in endwall 40. Compartment 22 is preferably arranged as shown with a roof 42, a vertical outer wall 40, a floor 44 and a vertical sidewall 26. Vertical front and rear walls are not shown. Roof 42 supports heater 30 and blower 32. The vertical outer wall 40 has a lower exit port 48 for venting heated gas, as will be explained.

Film is guided preferably by rollers 16 and 18, vertically past a source of filtered radiation provided by one or more lamps 50 enclosed in a chamber 52 whose sidewall 54, ceiling 56 and floor 58 each consists of optical filters, e.g. of red glass. The fourth wall of the lamp housing is a reflector 68 which augments the radiation falling on the film by reflecting the radiation from the lamps onto the film as it traverses its path through chamber 22. After it leaves guide roller 18, the film is subjected to additional thermal energy applied to the film by a stream of heated air or hot inert gas flowing parallel to the film surface, and blown along the film by blower 60, past heater 62 through a port 64 in the base 44. The film exits from chamber 22 through a slit 28 in wall 26 and passes through a fixing oven 66 and then to the takeup reel 20, or to other known apparatus for viewing, storing, editing, titling or otherwise processing the film.

The fixing oven consists of a chamber through which is circulated hot air at a controlled temperature in the range of 120° C. to 150° C.

The lamps 50, red glass filters 54, 56 and 58, and reflector, i.e. the optical development portion of the apparatus, is enclosed in Pyrex glass envelope 70 which extends to and is suitably supported by wall 26. Blowers 72 blows cool air along the filters and around the lamp housing. This cool air leaves envelope 70 via exit 74.

One or more of the accessories shown in FIGS. 3–10 may be incorporated into the apparatus of FIG. 1, along the film path to obtain specific benefits therefrom during the processing of the film.

In the apparatus of FIG. 1, the incident development radiation is very inefficiently utilized during the major portion of optical development. This is due to the fact that with such film, the initial absorption of the film in the red and near infrared is extremely low and the actual image, whose density is increasing exponentially with development times, does not reach appreciable density levels until near the end of the development operation. Thus the efficiency of development light utilization may be increased by passing the development radiation through the film several times. FIGS. 3, 4 and 5 illustrate three means for accomplishing this, it being intended that the means shown in these figures would be incorporated into the apparatus shown in FIG. 1 at location A, i.e. each of the apparatuses shown schematically in FIGS. 3, 4 and 5 would be positioned between the Pyrex housing 70 and the film 8 as the film makes its traverse of the vertical leg of its path through compartment 22 in FIG. 1.

FIG. 3 illustrates one manner in which development may be carried out using total internally reflecting prisms. Illustrated are five right angle prisms 80 which serve to redirect the optical development illumination, shown here in the form of a fairly collimated beam 55, through the film five times after the initial traversal. The film, during development, is continuously passing from top to bottom; thus, the highest levels of development radiation occur at the beginning of the optical development step.

In FIG. 4, the film 8 is shown festooned in front of the development radiation source. In this figure, the radiation 55' passes through the film seven times during the course of optical development. Each pass of radiation through the film reduces the intensity by approximately 20 percent due to a small absorption in the film base and reflections from the optical interfaces. Reflections from the interfaces may be minimized by immersing the film, during development, in a liquid having an index of refraction very close to that of the film base.

FIG. 5 illustrates still another technique for increasing the utilization of optical development radiation in which the illumination is trapped within the film by total internal reflections. As shown, a collimated beam of light 55'' enters a prism 90 at such an angle that the angle of the illuminating beam inside the film is greater than the critical angle and hence the illumination is totally internally reflected within the film between the top and bottom interfaces. In order to provide effective transition of the illuminating beam into the film, optical coupling may be required between the prism and the surface of the film being developed. In the case of a Mylar film base, whose index of refraction is 1.655, the angle of the development radiation must exceed the critical angle of 37°.

Optically developed films employ radiation for development. Since the film image density is generated at the completion of development, this final density may be sensed with a photodetector and a closed loop servo system employed in order to control either the development light intensity or the rate of film travel through the optical development unit, thus developing the film to a preselected density. This closed loop development has the advantages of developing the film to a predetermined level even for conditions under which the development rate varies due to lack of film reproducibility and aging, as well as changes in line voltage, ambient temperature, etc.

FIG. 6 is a sketch schematically showing one such closed loop control system. In operation, a narrow stripe near the edge of the film would be exposed to a preselected exposure level corresponding to a desired developed density level, for example, 1.0. Positioned immediately at the end of the optical development illuminated aperture and underneath the film is a photodetector 100 sensitive at the wavelengths of optical development. When the image is developed to a density of 1.0, the photodetector output (if it is proportional to the illumination intensity) is only a small fraction of the output prior to the start of optical development. This output signal may be employed to control and to modulate the intensity of the optical development radiation source. With the control unit, adjustable time constants may be introduced into the closed loop network in order to provide critical damping of the system. Circuits for accomplishing this control function are described in the G.E. SRC Manual (4th edition, p. 191). This closed loop control of FIG. 6 is intended to be incorporated into the apparatus of FIG. 1 at location B.

Automatic dodging may be carried out during optical development by scanning the film in two dimensions with a small diameter beam of intense optical development red or infrared radiation. The transmission of the film as a function of time (which by virtue of the scanning operation is converted to a spatial function) is sensed with a photodetector in a closed loop network in order to control the development lamp intensity. One such apparatus for carrying out automatic dodging which was constructed and which functioned satisfactorily so that 100 percent dodging was realized, employed illumination provided by a pulsed super-high-pressure xenon arc. The development illumination level was controlled by varying the pulse length of the arc. The illumination from this arc was collected by an elliptical reflector and imaged on a fiber optic element. The fiber optic element was caused to scan in one direction over the surface of the film by mounting the optic on a pen motor. Movement in directions orthogonal to the scanning direction was provided by a film drive unit. The illumination passing through the film was detected using a silicon photodiode. The output of this photodiode was employed to control logic circuits which modulated the width of the pulse supplied to the xenon arc. A sketch of this apparatus is shown in FIG. 7. There are, of course, other possible techniques for providing automatic dodging during development. Rotating mirror scanners might be employed in scanning the film. There are, in addition, many alternate techniques for modulating the development light intensity.

Since the resultant density of an optically developed film is a function of both the initial exposure and the optical development exposure, it is possible to modulate one exposure with the other, thus performing cross-correlation operations in the film. The general equation for optical development is $D = AI_0 e^{KI}$, where D is the developed image density, $I_0$ is the initial exposure, and I is the optical development exposure. One simple example of how this may be employed involves film annotating. An initial continuous tone image might be placed on the film and certain areas of exposed regions masked off by appropriate masks during optical development, thus providing annotation on the film by spatially modulating the optical development illumination. A second example involves preparing half-tone transparencies. Here the initial exposure may be provided by a continuous-tone negative. Prior to optical development, a half-tone dot pattern mask may be laid over the film, thus developing the image in a series of half-tone dots. Other examples might relate to information processing when it is desired to spatially modulate one spatial signal by a second signal.

A further example of development light image modulation involves placing a continuous-tone image on the film and developing the image through an optical grating. This modulates the image in the form of a grating pattern. If now the image is viewed by collimated light at the proper angle, the image would appear colored, the color of the image varying with the angle of viewing. Thus, means is available for obtaining any desired image color through the formation of a grating pattern in the film.

Through the use of optical development, it is possible to obtain both a positive and a negative image in one operation, e.g. as shown in FIG. 8. A film 8' already exposed, is developed while it is in intimate contact with a second film 8'' which has been subjected to a blanket initial exposure. As the image in the near film 8', shown in FIG. 8, increases in density, it reduces the level of development radiation received by the far film 8''; and thus, a negative of the near film 8' is formed in the far film 8''.

It is also possible to utilize mechanical procedures for rapidly changing the physical conditions during optical development in order to provide a change in film gamma in a very short space of time so that frame-to-frame gamma corrections may be realized. The dependence of gamma upon the physical conditions of development has been described in the above noted patent application.

FIG. 9 shows means for continuously developing a film employing a line source of light formed by an elliptical reflector 68'' so that the development is carried out over a narrow stripe on the film. The development is carried out at a relatively low temperature, e.g. 40° C., so that a high gamma condition is realized. Immediately adjacent to the film are two rollers 90, 92 mounted on a pivoted linkage 94 so that either roller may be placed in contact with the film. One roller 90 functions as a heat sink and is preferably constructed of metal. The temperature of this roller is maintained at 40° C. If the roller linkage is activated so that the metal roller is in contact with the film base, the heat sink would eliminate differential heating between image and non-image areas and the gamma of the film would immediately drop from a high level to a value close to 1.0. The other roller 92 is also metal, but is internally heated to a much higher temperature than the first roller, e.g. 100° C. When this roller is swung so as to be in contact with the film base, the temperature of the film being developed rises; the time constant for thermal diffusion through the film base being approximately 0.2 second. At this high development temperature, a low gamma is generated. Thus, using a very simple technique, it is possible to obtain three gamma conditions; the gamma conditions being established over a distance on the film of ¼" to ½", depending upon the roller diameter, web velocity, etc. Since the development rates are different under these different conditions, closed loop control of preselected density levels is desirable to automatically compensate for the different development rates.

Figure 10:
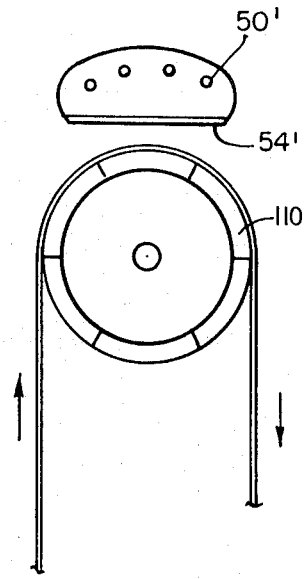

FIG. 10 shows an apparatus which can be used for achieving frame-to-frame gamma control, such as would be used with large film areas. As shown, the film 8 to be developed, passes over a rotatable segmented drum 110. Each segment of the drum may correspond in area to one or more frames of said film. Known means may be provided for insuring that the frames of film and the segments on drum 110 be kept in registry. With the arrangement shown in FIG. 10, gamma control is achieved by having several air manifolds (not shown) at one side of the drum, each drum segment being connected to its own manifold. The air supplied to each manifold may be heated or cooled to any desired temperature. As in the preceding description, the gamma may be sensed and fed back to control the temperature of the air so as to produce a desired gamma.

Similar results could be achieved by placing heat exchangers in each segment of the drum, connected to heated or cooled fluid reservoirs.

It will be evident that any of the above accessories or combinations of several accessories may be utilized in the apparatus of FIG. 1 and/or in place of portions of said apparatus and that various equivalents of such accessories may be utilized without departing from the intended scope of this invention which is defined in the appended claims.

I claim:

1. In an apparatus for optically processing nonsilver free radical photosensitive film containing a faint or latent image, so as to develop a visible image therefrom, which apparatus includes a chamber wherein development is to be accomplished and means for transporting the film through said chamber; the improved dry means for developing a visible image from said faint or latent image comprising:

means for exposing said film to suitable doses of red and near infrared radiation while said film is in said chamber, said means including means to filter out undesired wavelengths from the radiation to which said film is being exposed; and means for controlling the temperature of film while it is being so exposed to develop a visible image in said film from the faint or latent image present in said film.

2. The apparatus of claim 1 including means to apply heat to said film after a visible image has been developed, whereby said visible image is fixed.

3. The apparatus of claim 1 with means for applying a heat sink to the film being processed at some stage of its passage through the apparatus, to thereby control the temperature of the film while it is in said chamber.

4. The apparatus of claim 1 in which the development means includes means for passing the visible radiation through the film more than once.

5. The apparatus of claim 1 including in addition, means for sensing the density of the developed image in said film at one location along its path through the apparatus and for altering the quantity of radiation to which subsequent portions of film are exposed in response to said sensing means.

6. The apparatus of claim 5 wherein the sensing means controls the rate of film travel through the apparatus.

7. The apparatus of claim 5 wherein the sensing means controls the intensity of the radiation applied to develop a visible image in said film.

8. The apparatus of claim 1 wherein the means for controlling the temperature of the film while it is being exposed comprises means for providing a hot gas and causing same to flow parallel to the film surface.

9. The apparatus of claim 1 wherein said red or near infrared radiation is produced as a beam projected onto said film, after the film has been exposed;

and including in addition, means to vary the intensity of said beam in accordance with the output of a photo detector which senses the intensity of the beam after passing through the film; and means to scan said beam over the surface of said film.

References Cited

UNITED STATES PATENTS

| | | | |
|---|---|---|---|
| 3,063,350 | 11/1962 | Massena | 95—1 |
| 3,143,940 | 8/1964 | Brown et al. | 95— 89 X |
| 3,160,504 | 12/1964 | Montani | 96—45.2 |
| 3,166,998 | 1/1965 | Watson | 250—65 X |
| 3,178,997 | 4/1965 | Kelly | 96—45.2 X |
| 3,183,088 | 5/1965 | Hunt | 96—45.2 |
| 3,234,663 | 2/1966 | Ferris et al. | 96—45.2 X |
| 3,241,971 | 3/1966 | Kitze | 96—45.2 X |
| 3,282,184 | 11/1966 | Chen et al. | 95—94 X |
| 3,371,915 | 3/1968 | Kawamura et al. | 95—94 X |
| 3,440,944 | 4/1969 | Endermann et al. | 34—155 X |
| 3,127,825 | 4/1964 | Limberger | 355—106 |
| 3,224,354 | 12/1965 | Dietzgen et al. | 355—106 |
| 3,475,095 | 10/1969 | Norton et al. | 355—27 |
| 3,515,050 | 6/1970 | Attridge et al. | 95—89 |

JOHN M. HORAN, Primary Examiner

M. ALAN, Assistant Examiner

U.S. Cl. X.R.

95—1; 96—45.2; 250—65 R